(12) United States Patent
Nozoe

(10) Patent No.: US 6,386,034 B1
(45) Date of Patent: May 14, 2002

(54) ANGULAR VELOCITY SENSOR

(75) Inventor: Toshiyuki Nozoe, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/485,626

(22) PCT Filed: Jun. 11, 1999

(86) PCT No.: PCT/JP99/03152

§ 371 Date: May 8, 2000

§ 102(e) Date: May 8, 2000

(87) PCT Pub. No.: WO99/66289

PCT Pub. Date: Dec. 23, 1999

(30) Foreign Application Priority Data

Jun. 15, 1998 (JP) .......................................... 10-166623

(51) Int. Cl.[7] ................................................ G01P 9/04
(52) U.S. Cl. .................... 73/504.12; 73/1.37; 73/504.16
(58) Field of Search ......................... 73/504.12, 504.16, 73/504.15, 504.14, 1.37, 1.77

(56) References Cited

U.S. PATENT DOCUMENTS 5,939,630 A * 8/1999 Nozoe et al. ............ 73/504.16

FOREIGN PATENT DOCUMENTS

| JP | 6-207946 | 7/1994 |
| JP | 8-82525 | 3/1996 |
| JP | 8-327363 | 12/1996 |

* cited by examiner

*Primary Examiner*—John E. Chapman
(74) *Attorney, Agent, or Firm*—Ratner & Prestia

(57) ABSTRACT

An angular rate sensor comprises a determination circuit (30) for inputting an output signal of a full-wave rectifier circuit (22) and an output signal after amplified by a charge amplifier (25), and making a determination of abnormality, and an output clamping circuit (32) activated by an output signal of the determination circuit (30), if it makes a determination of abnormality, for clamping an output signal of a sensor output terminal at a level close to a power supply voltage or a grounding voltage.

2 Claims, 5 Drawing Sheets

ANGULAR VELOCITY SENSOR

This application is a U.S. National Phase Application of PCT International Application PCT/JP99/03152.

FIELD OF THE INVENTION

The present invention relates to an angular rate sensor.

BACKGROUND OF THE INVENTION

FIG. 4 shows an example of angular rate sensors that have been proposed in the past. In FIG. 4, a support pin 101 made of metal is press-fitted perpendicularly and secured in a weight plate (not shown in the figure), and one end of another support pin 102 made of metal is press-fitted and secured in the support pin 101 in an orthogonal direction to it. A block 103 also made of metal is fixed at the other end of the support pin 102 by soldering. Vibration plates 104 and 105 are fixed at both ends of the metal block 103. A piezoelectric element 106 is bonded on the vibration plate 104 to constitute a vibration exciter 150, and another piezoelectric element 107 is bonded on the vibration plate 105 to constitute a means 160 for detecting a level of vibrations. A tip of the vibration plate 104 is extended in a manner to form a right angle with the piezoelectric element 106 to become a detecting plate 108. A tip of the vibration plate 105 is also extended in the same manner to form a right angle with the piezoelectric element 107 to become another detecting plate 109. Piezoelectric elements 110 and 111 are bonded on the detecting plates 108 and 109 respectively, to constitute detecting means 170 and 180 for detecting a Coriolis' force generated in proportion to an angular rate. All of the above complete an element unit 112 of a tuning-fork type angular rate sensor.

A structure of FIG. 4 further comprises;
  (a) a current amplifier 120 for amplifying an output signal from the piezoelectric element 107 provided on the vibration plate 105 to detect a level of vibrations of the vibration plate 105, which vibrates in a tuning-fork phenomenon in concert with vibrations of the vibration plate 104;
  (b) a full-wave rectifier circuit 122 for producing a D.C. voltage by rectifying an output signal of a band-pass filter (hereinafter referred to as "BPF") 121, wherein an output signal of the current amplifier 120 is input;
  (c) an automatic gain control circuit (hereinafter referred to as "AGC") 123 whose amplification factor for the output signal of the BPF 121 varies according to a magnitude of an output signal of the full-wave rectifier circuit 122;
  (d) a driver 124 for driving the piezoelectric element 106 bonded on the vibration plate 104 in accordance with a magnitude of an output signal of the AGC 123;
  (e) a charge amplifier 125 for inputting and amplifying output signals of the piezoelectric elements 110 and 111, which detect a Coriolis' force generated in proportion to an angular rate;
  (f) a synchronous detection circuit 127 for detecting an output signal of a BPF 126, wherein an output signal of the charge amplifier 125 is input;
  (g) a sensor output terminal 129 for outputting an output signal of a low-pass filter (hereinafter referred to as "LPF") 128, wherein an output signal of the synchronous detection circuit 127 is input;
  (h) a determination circuit 130 for inputting the output signal (an amplitude of signal at a point "A") of the full-wave rectifier circuit 122 and the output signal (an amplitude of signal at a point "B") after amplified by the charge amplifier 125, and determining an abnormality; and
  (i) an abnormality diagnosis terminal 131 for communicating an abnormality to an outside from the determination circuit 130, when it determines the abnormality. A reference numeral 132 represents a power supply connection terminal, and a reference numeral 133 represents a grounding terminal. The elements described above constitute a driving circuit 134.

The angular rate sensor is completed by having the above element unit 112 of a tuning-fork type angular rate sensor and the driving circuit 134.

In addition, a voltage E is supplied from a power source 135 to the power supply connection terminal 132 of the driving circuit 134. A load resistor 136 is connected to the sensor output terminal 129, and an output signal C is supplied toward a controller side (not shown in the figure). In the like manner, a load resistor 137 is connected to the abnormality diagnosis terminal 131, and an output signal D is supplied toward another controller side (not shown in the figure).

FIG. 5 shows changes in voltage of the output signal C, the output signal D and a voltage of the grounding terminal 133 in the angular rate sensor, that occur when a circuit opens, for an instance, at a point "X" between the grounding terminal 133 of the driving circuit 134 and the earth ground.

In the prior art technique described above, it is possible to make a determination that an opening has taken place in the circuit, since the output signal D of the abnormality diagnosis terminal, 131 changes quickly from a high voltage level to a low voltage level as shown in FIG. 5, if the circuit opens at the point "X" between the grounding terminal 133 of the driving circuit 134 and the earth ground.

However, the output signal C of the sensor output terminal 129 shows a phenomenon, in which the voltage increases gradually toward a level of power source voltage E, as shown by a dashed line in FIG. 5, due to a combined impedance of the driving circuit 134 and the load resistors 136 and 137. Therefore, it is not possible to determine whether the angular rate sensor is normal or abnormal, with the output signal C alone.

In addition, a voltage of the grounding terminal 133 shows only a phenomenon of increasing gradually to the level of power source voltage E, it is not possible to distinguish between normality and abnormality of the sensor with this signal.

However, there are controllers, depending on their types, that are not capable of taking an output signal D of the abnormality diagnosis terminal 131 due to a limitation in number of input signals. Or, there are other cases wherein a system distributes and inputs only an output signal C of the sensor output terminal 129 into a plurality of controllers to serve for their individual control functions. It is desirable for a system of these types to instantly determine whether the angular rate sensor is normal or abnormal, only with the output signal C of the sensor output terminal 129.

SUMMARY OF THE INVENTION

The angular rate sensor of the present invention comprises:
  (a) a vibration exciter for providing a vibration body with vibrations;
  (b) a means for detecting a level of vibrations of the vibration body;

(c) a detecting means for detecting a Coriolis' force produced in proportion to an angular rate;

(d) a current amplifier for amplifying an output signal of the means of detecting a level of vibrations;

(e) a full-wave rectifier circuit for producing a D.C. voltage by rectifying an output signal of a band-pass filter, wherein an output signal of the current amplifier is input;

(f) an automatic gain control circuit whose amplification factor for the output signal of the band-pass filter varies according to a magnitude of an output signal of the full-wave rectifier circuit;

(g) a driver for driving the vibration exciter according to a magnitude of an output signal of the automatic gain control circuit;

(h) a charge amplifier for inputting and amplifying a signal detected by the detecting means for detecting a Coriolis' force;

(i) a synchronous detection circuit for detecting an output signal of a bandpass filter, wherein an output signal of the charge amplifier is input;

(j) a sensor output terminal for outputting an output signal of a low-pass filter, wherein an output signal of the synchronous detection circuit is input;

(k) a determination circuit for inputting the output signal of the full-wave rectifier circuit and the output signal after amplified by the charge amplifier, and for determining an abnormality; and (l) an output clamping circuit activated by an output signal of the determination circuit, when the determination circuit makes a determination of abnormality, for clamping the output signal of the sensor output terminal at a level close to a power supply voltage or a grounding voltage. This structure can realize the angular rate sensor that is capable of making a determination instantly only with a sensor output signal, as to whether the angular rate sensor is normal or abnormal.

DESCRIPTION OF THE PREFERRED EMBODIMENTS (First Exemplary Embodiment)

A first exemplary embodiment of the present invention will be described hereinafter by referring to FIG. 1 through FIG. 3.

Figure 1:
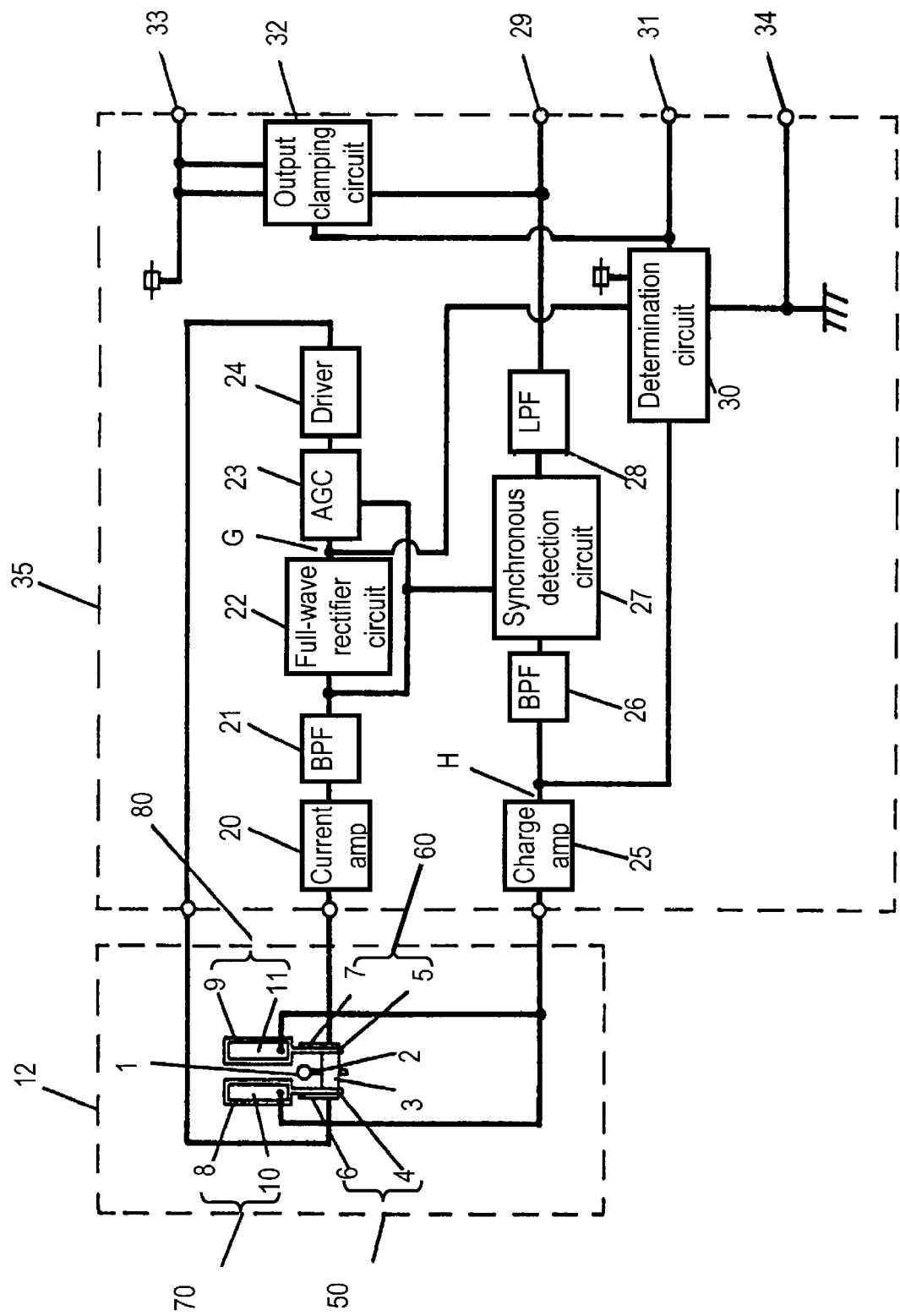
FIG. 1 is a block diagram depicting an exemplary embodiment of an angular rate sensor of the present invention.

FIG. 1 is a block diagram depicting the first exemplary embodiment of an angular rate sensor of the present invention. FIG. 2 is a block diagram depicting a principal portion of a driving circuit shown in FIG. 1. FIG. 3 is a graphical representation of an output signal of this exemplary embodiment under abnormal condition.

In FIG. 1, a support pin 1 made of metal is press-fitted perpendicularly and secured in a weight plate (not shown in the figure), and one end of another support pin 2 also made of metal is press-fitted and secured in the support pin 1 in an orthogonal direction to it. A block 3 made of metal is fixed at the other end of the support pin 2 by soldering. Vibration plates 4 and 5 are fixed at both ends of the metal block 3. A piezoelectric element 6 is bonded on the vibration plate 4 to constitute a vibration exciter 50, and another piezoelectric element 7 is bonded on the vibration plate 5 to constitute a means 60 for detecting a level of vibrations. A tip of the vibration plate 4 is extended in a manner to form a right angle with the piezoelectric element 6 to become a detecting plate 8. A tip of the vibration plate 5 is also extended in a manner to form a right angle with the piezoelectric element 7 to become another detecting plate 9. Piezoelectric elements 10 and 11 are bonded respectively on the detecting plates 8 and 9, to constitute detecting means 70 and 80 for detecting a Coriolis' force generated in proportion to an angular rate. An element unit 12 of a tuning-fork type angular rate sensor is completed by having the above elements.

A structure of FIG. 1 comprises;

(a) a current amplifier 20 for amplifying an output signal from the piezoelectric element 7 provided on the vibration plate 5 to detect a level of vibrations of the vibration plate 5, which vibrates in a tuning-fork phenomenon in concert with vibrations of the vibration plate 4;

(b) a full-wave rectifier circuit 22 for producing a D.C. voltage by rectifying an output signal of a band-pass filter (hereinafter referred to as "BPF") 21, wherein an output signal of the current amplifier 20 is input;

(c) an automatic gain control circuit (hereinafter referred to as "AGC") 23 whose amplification factor for the output signal of the BPF 21 varies according to a magnitude of an output signal of the full-wave rectifier circuit 22;

(d) a driver 24 for driving the piezoelectric element 6 bonded on the vibration plate 4 according to a magnitude of an output signal of the AGC 23;

(e) a charge amplifier 25 for inputting and amplifying output signals of the piezoelectric elements 10 and 11, which detect a Coriolis' force generated in proportion to an angular rate;

(f) a synchronous detection circuit 27 for detecting an output signal of a BPF 26, wherein an output signal of the charge amplifier 25 is input;

(g) a sensor output terminal 29 for outputting an output signal of a low-pass filter (hereinafter referred to as "LPF") 28, wherein an output signal of the synchronous detection circuit 27 is input;

(h) a determination circuit 30 for inputting the output signal (an amplitude of signal at a point "G") of the full-wave rectifier circuit 22 and the output signal (an amplitude of signal at a point "H") after amplified by the charge amplifier 25, and for determining abnormality; and (i) an abnormality diagnosis terminal 31 for communicating an abnormality to an outside from the determination circuit 30, when it determines the abnormality. The structure also includes an output clamping circuit 32 activated by an output signal of the determination circuit 30, when the determination circuit 30 makes a determination of abnormality, for clamping the output signal of the sensor output terminal 29 at a level close to a power supply voltage or a grounding voltage. A reference numeral 33 represents a power supply connection terminal, and a reference numeral 34 represents a grounding terminal. The foregoing elements constitute a driving circuit 35.

The angular rate sensor is completed by having the above element unit 12 of a tuning-fork type angular rate sensor and the driving circuit 35.

Figure 2:
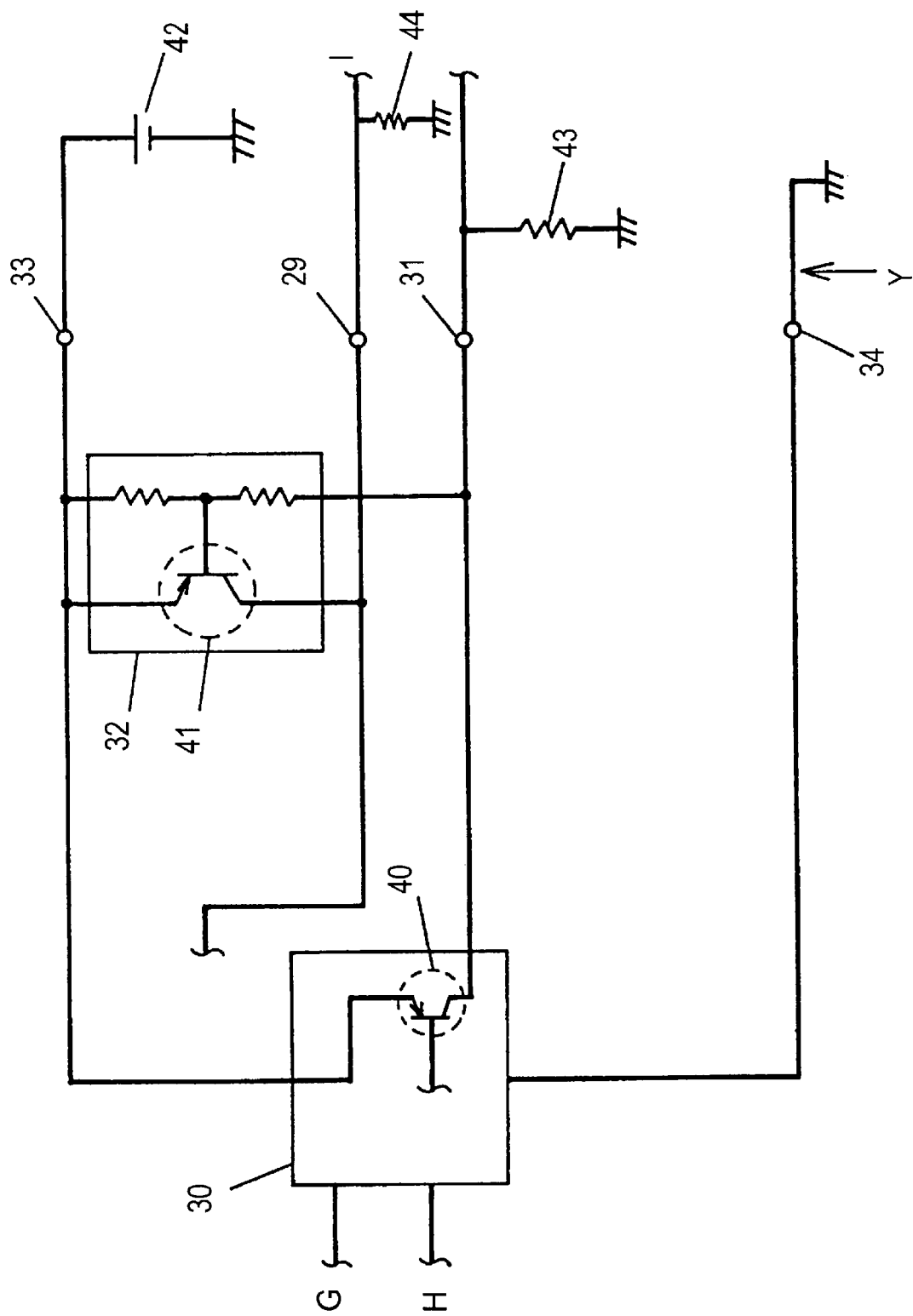
FIG. 2 is a block diagram depicting an essential portion of a driving circuit of the same angular rate sensor.
Figure 4:
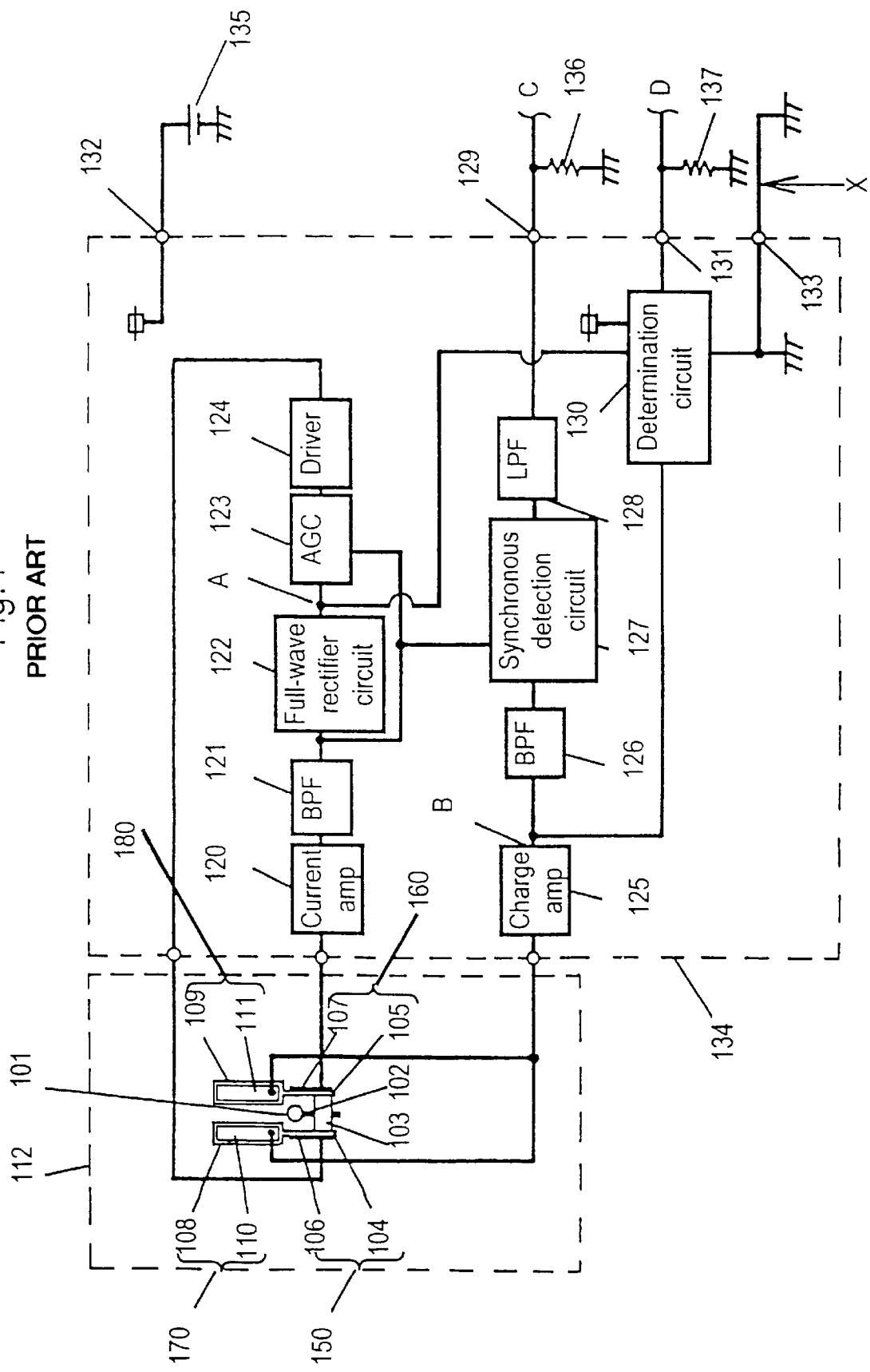
FIG. 4 is a block diagram depicting an angular rate sensor of the prior art.
Figure 5:
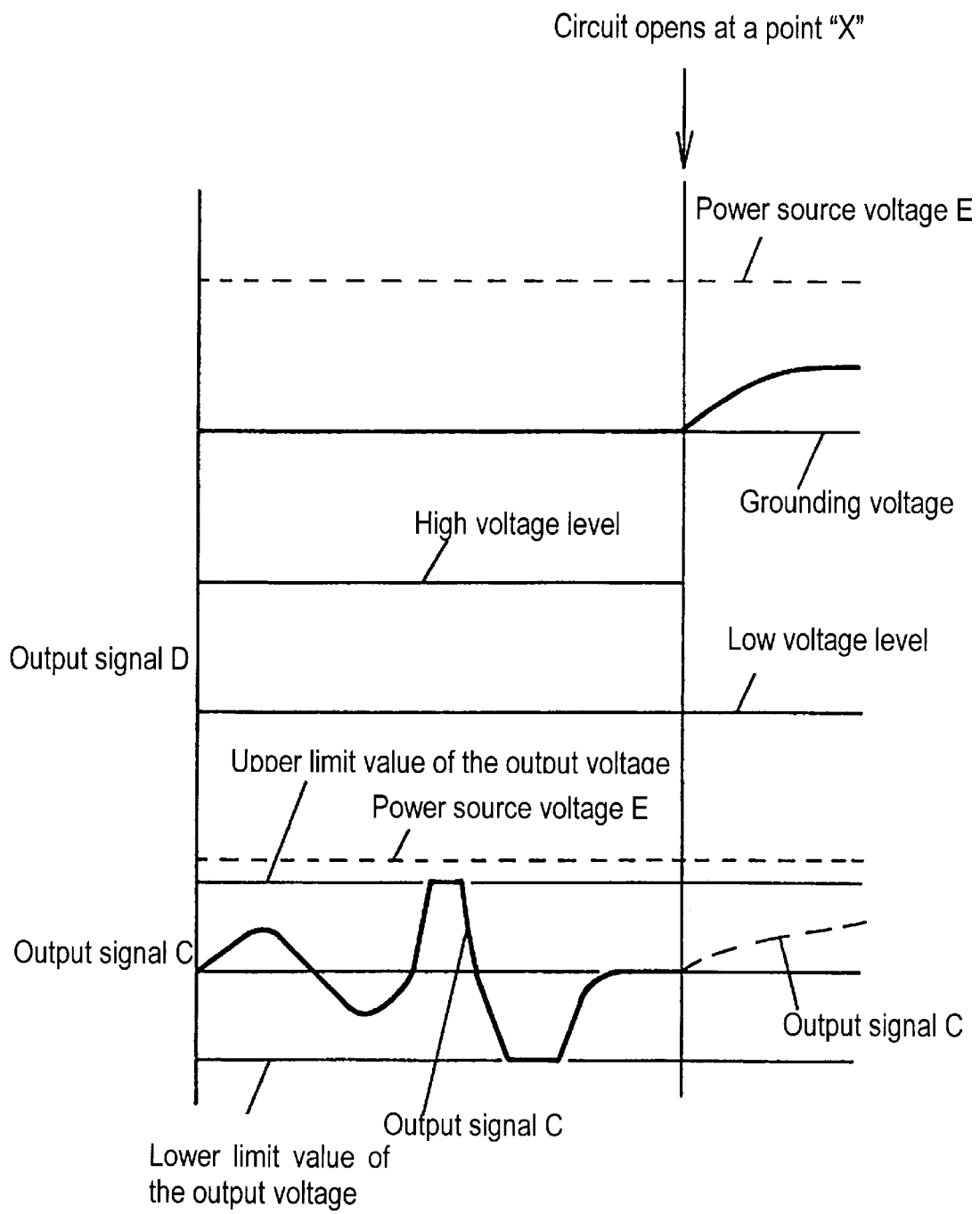
FIG. 5 is a graphical representation of output signals of the same angular rate sensor under an abnormal condition.

If a circuit opens at a point "Y" between the earth ground and the grounding terminal 34 in FIG. 2, an output transistor 40 in the determination circuit 30 turns off by detecting an abnormality in amplitude of vibrations of the element unit 12 of a tuning-fork type angular rate sensor through a signal at the point "G". This terminates a current flowing from a power supply 42 through the power supply connection terminal 33, and thereby a voltage of the abnormality diagnosis terminal 31 starts decreasing toward a level close to the grounding voltage through a load resistor 43. On the other hand, a transistor 41 in the output clamping circuit 32 turns on, as it is forward-biased, thereby causing a current to flow from the power supply 42 to the sensor output terminal 29. Consequently, a load resistor 44 immediately clamps a voltage of the sensor output terminal 29 at a level close to the power supply voltage (refer to an output signal I shown in FIG. 4). The output signal I is conveyed toward a controller side (not shown in the figures).

Figure 3:
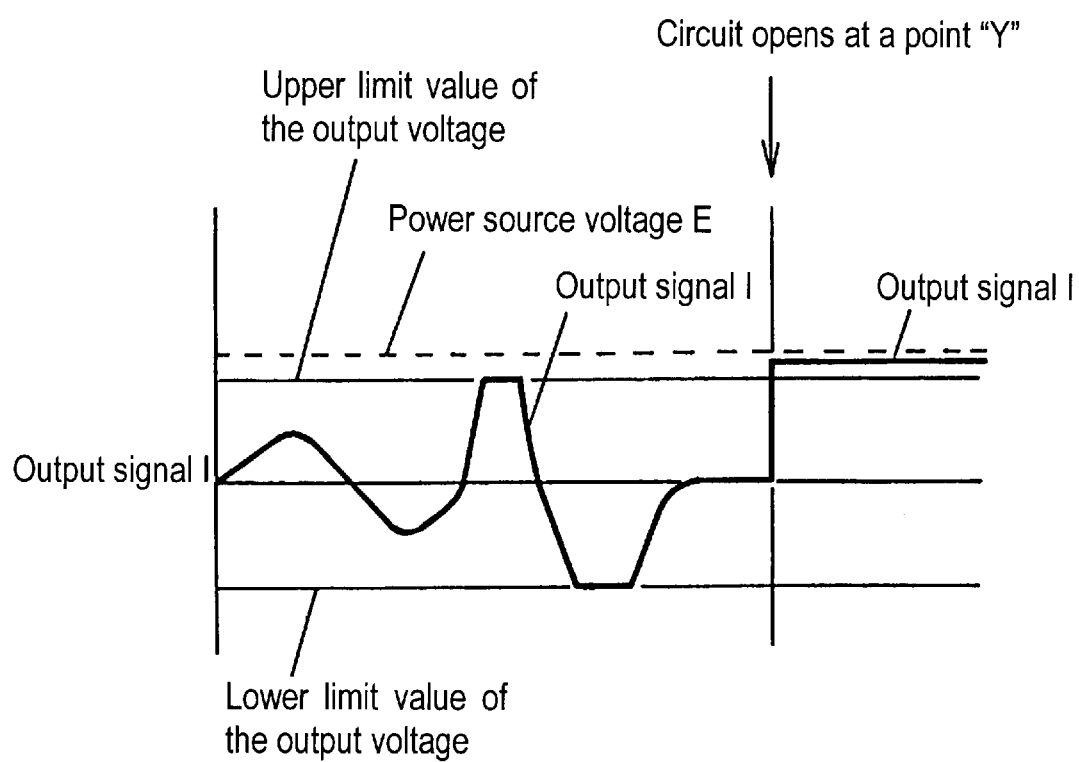
FIG. 3 is a graphical representation of an output signal of the same angular rate sensor under an abnormal condition.

An upper limit value and a lower limit value of the output voltage from the sensor output terminal 29 under normal operating condition of the angular rate sensor are preestablished, as shown in FIG. 3. As described, a distinction between a normal condition and an abnormal condition can be made instantly only with the output signal I of the sensor output terminal 29. Accordingly, the foregoing structure not only improves reliability of the angular rate sensor, but also allows a sound design of an abnormality determination system in the controller side.

In the present exemplary embodiment, although what has been described is an example in that the output signal I of the sensor output terminal 29 is clamped at a level close to the power supply voltage, it may as well be clamped, alternatively, at a level close to the grounding voltage.

Although what has been described in the present exemplary embodiment is only an example in that the element unit of a tuning-fork type angular rate sensor has the structure having piezoelectric elements bonded on vibration plates, this is not necessarily restrictive. It can be a tuning-fork vibrating unit composed of single-crystal piezoelectric material such as quartz. Furthermore, a vibrating body needs not be limited to the type having a tuning-fork type vibrating structure of the prior art.

INDUSTRIAL APPLICABILITY

The present invention provides an angular rate sensor that is capable of making a determination instantly as to whether the angular rate sensor is normal or abnormal, only with a sensor output signal. This can be achieved by providing a determination circuit for inputting an output signal of a full-wave rectifier circuit and an output signal after amplified by a charge amplifier, and for determining an abnormality, and an output clamping circuit activated by an output signal of the determination circuit, when the determination circuit determines of abnormality, for clamping an output signal of a sensor output terminal at a level close to a power supply voltage or a grounding voltage.

What is claimed is:

1. An angular rate sensor for a vibration body comprising:
means for detecting a level of vibrations of a vibration body;
detecting means for detecting a Coriolis' force produced in proportion to an angular rate;
a current amplifier for amplifying an output signal of said means of detecting a level of vibrations;
a full-wave rectifier circuit for producing a D.C. voltage by rectifying an output signal of a band-pass filter, wherein an output signal of said current amplifier is input;
a charge amplifier for inputting and amplifying a signal detected by said detecting means for detecting a Coriolis' force;
a synchronous detection circuit for detecting an output signal of a band-pass filter, wherein an output signal of said charge amplifier is input;
a sensor output terminal for outputting an output signal of a low-pass filter, wherein an output signal of said synchronous detection circuit is input;
a determination circuit for inputting the output signal of said full-wave rectifier circuit and an output signal of said charge amplifier, and for making a determination of abnormality, said determination circuit having an output transistor connected to an abnormality diagnosis terminal, said output transistor turns off if an abnormality is detected which causes a voltage of said abnormality diagnosis terminal to decrease to a level close to a grounding voltage; and
an output clamping circuit activated by an output signal of said determination circuit, if said determination circuit makes a determination of abnormality, for clamping the output signal of said sensor output terminal at a level close to a power supply voltage or a grounding voltage.

2. An angular rate sensor for a vibration body comprising:
means for detecting a level of vibrations of a vibration body;
detecting means for detecting a Coriolis' force produced in proportion to an angular rate;
a current amplifier for amplifying an output signal of said means of detecting a level of vibrations;
a full-wave rectifier circuit for producing a D.C. voltage by rectifying an output signal of a band-pass filter, wherein an output signal of said current amplifier is input;
a charge amplifier for inputting and amplifying a signal detected by said detecting means for detecting a Coriolis' force;
a synchronous detection circuit for detecting an output signal of a band-pass filter, wherein an output signal of said charge amplifier is input;
a sensor output terminal for outputting an output signal of a low-pass filter, wherein an output signal of said synchronous detection circuit is input;
a determination circuit for inputting the output signal of said full-wave rectifier circuit and an output signal of said charge amplifier, and for making a determination of abnormality; and
an output clamping circuit having a transistor connected to a sensor output terminal, said output clamping circuit activated by an output signal of said determination circuit, if said determination circuit makes a determination of abnormality, said transistor is forward-biased and said output clamping circuit clamps the output signal of said sensor output terminal at a level close to a power supply voltage.

* * * * *